United States Patent
Zhang et al.

(10) Patent No.: US 11,048,629 B2
(45) Date of Patent: Jun. 29, 2021

(54) METHOD, APPARATUS AND COMPUTER PROGRAM PRODUCT FOR STORING DATA

(71) Applicant: EMC IP Holding Company LLC, Hopkinton, MA (US)

(72) Inventors: Leihu Zhang, Beijing (CN); Chen Gong, Beijing (CN); Ming Zhang, Beijing (CN); Hao Fang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 12 days.

(21) Appl. No.: 16/569,094

(22) Filed: Sep. 12, 2019

(65) Prior Publication Data

US 2020/0133858 A1 Apr. 30, 2020

(30) Foreign Application Priority Data

Oct. 26, 2018 (CN) .......................... 201811261832.3

(51) Int. Cl.
  *G06F 3/06* (2006.01)
  *G06F 12/0802* (2016.01)
(52) U.S. Cl.
  CPC ........ *G06F 12/0802* (2013.01); *G06F 3/0608* (2013.01); *G06F 3/0655* (2013.01); *G06F 3/0673* (2013.01); *G06F 3/067* (2013.01); *G06F 2212/60* (2013.01)
(58) Field of Classification Search
  None
  See application file for complete search history.

(56) References Cited

U.S. PATENT DOCUMENTS

| | | | |
|---|---|---|---|
| 9,626,249 B1 * | 4/2017 | Bushman | H03M 7/30 |
| 10,324,656 B1 | 6/2019 | Zhao et al. | |
| 10,409,496 B1 | 9/2019 | Si et al. | |
| 10,452,641 B1 | 10/2019 | Batchu | |
| 10,635,359 B2 | 4/2020 | Romanovskiy | |
| 10,860,245 B2 | 12/2020 | Zhao et al. | |
| 2006/0212672 A1 * | 9/2006 | Chandrasekaran | G06F 3/0676 711/171 |
| 2016/0142934 A1 * | 5/2016 | Ahmadzadeh | H04W 72/04 370/328 |
| 2020/0019329 A1 * | 1/2020 | Faibish | G06F 12/0804 |

* cited by examiner

*Primary Examiner* — Brian R Peugh
(74) *Attorney, Agent, or Firm* — BainwoodHuang (57) ABSTRACT

Techniques store data. Such techniques involve: in response to receiving a request for writing data to a file, determining a type of the file; determining a compression property of the data based on the determined type; determining a storage area corresponding to the data to be written in a storage device for storing the file; and storing the data into the storage area, based on the compression property. Such techniques can determine, based on a type of a file involved in an input/output (I/O) request, a compression property of the data for the I/O request, and further determine whether a data compression operation is to be performed prior to storing the data. Accordingly, the techniques can avoid an unnecessary compression operation while reducing the storage space required for storing data as much as possible, thereby improving performance of system.

21 Claims, 7 Drawing Sheets

METHOD, APPARATUS AND COMPUTER PROGRAM PRODUCT FOR STORING DATA

CROSS-REFERENCE TO RELATED APPLICATION

This application claims priority to Chinese Patent Application No. CN201811261832.3, on file at the China National Intellectual Property Administration (CNIPA), having a filing date of Oct. 26, 2018, and having "METHOD, APPARATUS AND COMPUTER PROGRAM PRODUCT FOR STORING DATA" as a title, the contents and teachings of which are herein incorporated by reference in their entirety.

FIELD

Embodiments of the present disclosure generally relate to the field of data storage, and more specifically, to a method, a device and a computer program product for storing data.

BACKGROUND

Currently, a storage system may compress data prior to storing the data to a storage device, so as to save storage space for the data. When data stored in a compressed manner is read, a decompression operation is performed on the data to achieve the uncompressed data. However, compressions of different data can achieve different effects. For example, for data that have been compressed, recompression typically cannot significantly reduce the amount of data thereof. For such data, a compression operation prior to storage does not significantly reduce the storage space for the data, but incurs instead extra processing overhead due to compression and decompression operations.

SUMMARY

Embodiments of the present disclosure provide a method, a device, and a computer program product for storing data.

In a first aspect of the present disclosure, there is provided a method of storing data. The method includes: in response to receiving a request for writing data to a file, determining a type of the file; determining a compression property of the data based on the determined type; determining a storage area corresponding to the data to be written in a storage device for storing the file; and storing the data into the storage area based on the compression property.

In a second aspect of the present disclosure, there is provided a device for storing data. The device includes at least one processing unit and at least one memory. The at least one memory is coupled to the at least one processing unit and stores instructions which, when executed by the at least one processing unit, causes the device to perform acts including: in response to receiving a request for writing data to a file, determining a type of the file; determining a compression property of the data, based on the determined type; determining a storage area corresponding to the data to be written in a storage device for storing the file; and storing the data into the storage area, based on the compression property.

In a third aspect of the present disclosure, there is provided a computer program product. The computer program product is tangibly stored in a non-transient computer storage medium and includes machine-executable instructions. The machine-executable instructions, when executed by a device, cause the device to perform any step of the method as described in the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features and advantages of example embodiments of the present disclosure will become more apparent, through the following detailed description of the example embodiments of the present disclosure with reference to the accompanying drawings, in which the same reference symbols generally refer to the same elements.

Throughout the drawings, the same or similar reference symbols refer to the same or similar elements.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will now be described in detail with reference to the accompanying drawings. Although the drawings illustrate preferred embodiments of the present disclosure, it would be appreciated that the present disclosure may be implemented in various manners but cannot be construed as being limited by the embodiments illustrated herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment." The terms "first," "second," and the like may refer to different or the same objects. Other definitions, either explicit or implicit, may be included below.

Figure 1:
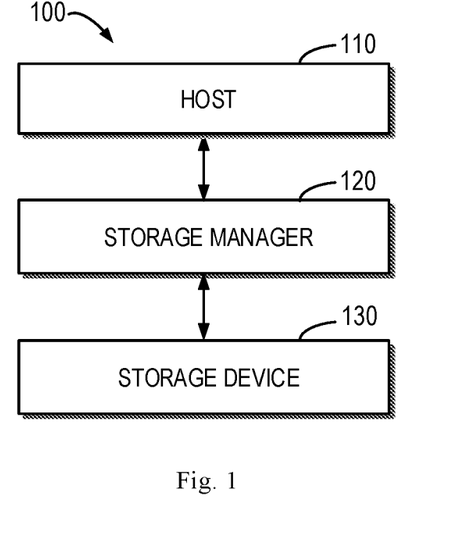
FIG. 1 illustrates a schematic diagram of an example environment in which embodiments of the present disclosure can be implemented.

FIG. 1 illustrates a block diagram of an example environment 100 in which embodiments of the present disclosure can be implemented. As shown in FIG. 1, the environment 100 includes a host 110, a storage manager 120 and a storage device 130. It would be appreciated that the structure of the environment 100 is described merely as an example, without implying any limitation to the scope of the present disclosure. For example, the embodiments of the present disclosure may also be applied to an environment different from the environment 100.

In the environment 100, the host 110 may, for example, be any physical computer, virtual machine, server and the like for running a user application. The host 110 may transmit an input/output (I/O) request to the storage manager 120, which is provided for, for example, reading data from the storage device 130 and/or writing data to the storage device 130, etc. In response to receiving a read request from the host 110, the storage manager 120 may read data from the storage device 130, and return the read data to the host 110. In response to receiving a write request from the host 110, the storage manager 120 may write data to the storage device 130. The storage device 130 may be any nonvolatile storage medium currently known or to be developed in the future, such as a magnetic disk, a solid state disk (SSD), an array of disks or the like.

In order to save space required for data storage, a compression/decompression engine (not shown) may be deployed in the storage manager 120. For example, when receiving, from the host 110, a write request for writing data to the storage device 130, the storage manager 120 may compress the data to be stored with the compression/decompression engine, and then store the compressed data to the storage device 130. As such, when data stored in a compressed manner is read, the storage manager 120 is required to decompress the read data with the compression/decompression engine, and then return the decompressed data to the host 110.

As described above, compressions of different data can achieve different effects. For example, for data that have been compressed, recompression cannot reduce significantly the amount of data thereof. For such data, a compression operation prior to storage does not significantly reduce the storage space for the data, but incurs instead extra processing overhead due to compression and decompression operations.

The embodiments of the present disclosure provide a solution for storing data, so as to solve the above problem and one or more of other potential problems. The solution is capable of determining a compression property of data for an I/O request based on a type of file involved in the I/O request, and thus determining whether an operation of data compression is perform for the data prior to storing the same. In the way, the solution can avoid an unnecessary compression operation while reducing a space required for data storage as much as possible, thereby improving performance of system.

Figure 2:
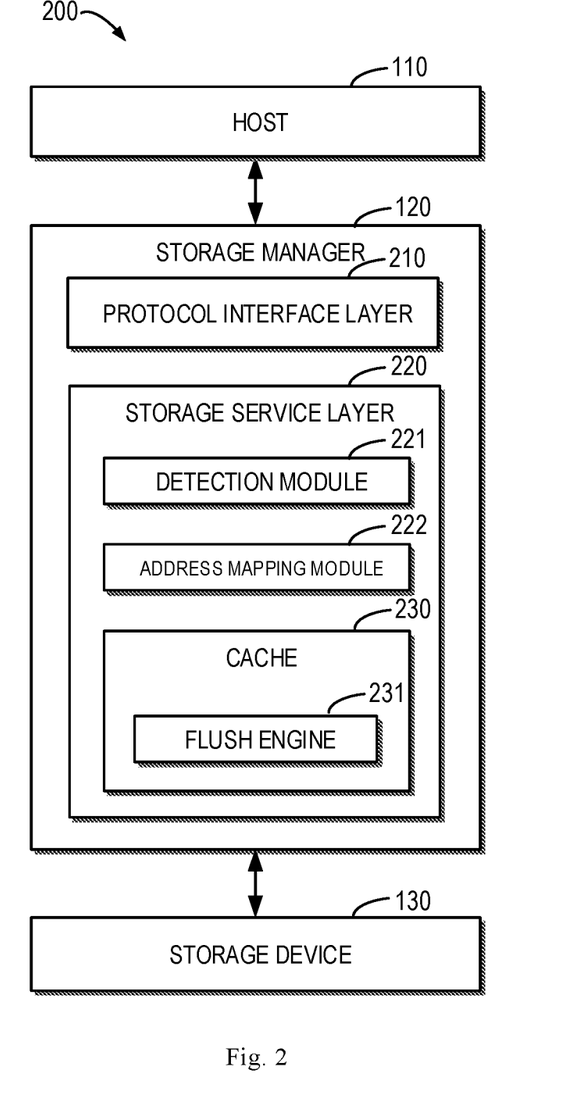
FIG. 2 illustrates a block diagram of an example storage system according to embodiments of the present disclosure.

FIG. 2 illustrates a block diagram of an example storage system 200 according to embodiments of the present disclosure. In the FIG. 2, the storage manager 120 may generally include a protocol interface layer 210 and a storage service layer 220. In some embodiments, as will be described below with reference to FIG. 4, the number layers of storage service in the storage manager 120 may vary depending on the service type provided by the storage manager 120. As shown in FIG. 2, the storage service layer 220 may include, for example, a detection module 221, an address mapping module 222 and a cache module 230. It would be appreciated that the structure and functionality of the storage system 200 are described merely as an example, without implying any limitation to the scope of the present disclosure.

In the storage system 200, the storage manager 120 may be a device separated from the host 110, which may be, for example, in communicative coupling to the host 110 via a network or in other manners. The storage manager 120 may provide a network file system interface (such as, a common Internet file system (CIFS), a network file system (NFS) or the like) to the host 110 via the protocol interface layer 210, and provide a data storage service to the host 110 with a storage service layer. For example, the host 110 may send, via the file system interface provided through the storage manager 120, an I/O request, such as creating a file, writing data to the created file, rewriting the data in the file, reading data in the file and/or deleting the created file, or the like. Data associated with the file may be stored in the storage device 130. Physical storage space in the storage device 130 may be divided into a plurality of logical storage units for management.

When the host 110 sends, to the storage manager 120, a request for writing data into a file (such as, creating a file, writing data to the created file, rewriting data in a certain file or the like), the request may be forwarded to the storage service layer 220 via the protocol interface layer 210. In response to receiving the request, the detection module 221 in the storage service layer 220 may detect the type of the file, to determine whether the file is a compressed file.

In some embodiments, the detection module 221 may determine the type of the file based on a file name of the file. For example, the detection module 221 may obtain the file name of the file from the request. The obtained file name may typically include a main file name and an extension file name, where the extension file name may typically indicate the type of the file. In some embodiments, the detection module 221 may match the extension file name of the file obtained from the request with one or more predetermined extension names indicating that a type is a compressed file. If the extension file name of the file is matched with one of the one or more predetermined extension names, then it means that the file is a compressed file. The examples of the predetermined extension names indicating a compressed file include, but are not limited to zip, ace, tar, jar, gz, lzh, iso, uue, arj, bz2 and the like.

In some embodiments, if the file requested to perform writing thereon has not been created, the storage service layer 220 may first create the requested file in its file system (not shown in FIG. 2). For example, the storage service layer 220 may generate and store metadata of a file system corresponding to the file, for recording information related to the file. The metadata of the file system, for example, may be stored in the storage device 130 or other storage device (which may be located at the storage manager 120, or separated from the storage manager 120). In an operating system, such as UNIX, the metadata of the file system typically includes an i node (inode), an indirect block (abbreviated as IB), and the like. The storage service layer 220 may determine whether the file is a compressed file, for example, based on the file name of the created file, and then record the information indicating whether the file is a compressed file in the metadata of the file system (for example, inode) corresponding to the file. As such, when receiving a request for writing data into the created file, the detection module 221 in the storage service layer 220 may obtain the metadata of the file system associated with the file, and determine the type of the file based on the metadata of the file system.

Additionally or alternatively, in some embodiments, the detection module 221 may also determine whether the file is a compressed file based on certain contents of the file. Typically, in the file, there may be a particular sequence of bytes indicating the type of the file, which is also referred to as "magic number." For example, taking a rar file as an example, several bytes at the beginning of it are typically "Rar". Taking a zip file as an example, several bytes at the beginning of it are typically "PK." Taking a tar file as an example, the magic number typically starts from the $257^{th}$ byte and is "ustar." In some embodiments, the detection module 221 may open a file and obtain the sequence of bytes indicating the type of the file, and then match the obtained sequence of bytes with one or more predetermined sequences of bytes (for example, "Rar," "PK," "ustar" and the like) indicating that the type is a compressed file. If a sequence of bytes obtained from a file is matched with one of one or more predetermined sequences of bytes, it indicates that the file is a compressed file. The magic number-based manner can avoid the case of being unable to determine whether the file is a compressed file through its extension file name which is caused by renaming of the compressed file.

In the way, when the I/O request sent from the host 110 is forwarded to the storage service layer 220 via the protocol interface layer 210, the detection module 221 in the storage service layer 220 can determine whether the file involved in the I/O request is a compressed file, thereby determining the compression property of the data involved in the I/O request. For example, if the file involved in the I/O request is a compressed file, the detection module 221 may determine that the data involved in the I/O request (for example, a write request) may be compressed data, and it is unnecessary to recompress the data before being stored in the storage device 130 (therefore, the data is also referred to as "incompressible" data herein); and otherwise, the data involved in the I/O request may be regarded as compressible data. In some embodiments, the detection module 221 may further generate a tag for indicating the compression property of the data involved in the I/O request, and tag the I/O request with the generated tag. The tagged I/O request may be sent to the address mapping module 222.

Normally, there are a file offset address for indicating a write position and a length of data to be written in an I/O request for writing the data to a file. However, as mentioned above, the physical storage space in the storage device 130 may be divided into a plurality of logical storage units for management. The address mapping module 222 may implement a conversion from a file offset address to an address of logical storage unit. In addition, the address mapping module 222 may also maintain a mapping relation between a logical storage unit and an actual physical storage space.

Hence, the address mapping module 222 may determine a storage area corresponding to data to be written in the storage device 130, based on the file offset address and the length of write in the tagged I/O request. For example, the address mapping module 222 may convert the file offset address in the tagged I/O request into an address in the storage device 130, and send the I/O request undergoing the address conversion to the cache 230.

The cache 230 may include a high speed persistent storage medium for caching the received I/O request and the data involved therein. Since the cached I/O request includes a tag indicating the compression property of the data, the tag indicating whether the data is compressible is stored in associated with the data at the cache 230. The cached data may be flushed by a flush engine 231 as shown in FIG. 2 into the storage device 130. The flush engine 231 may be a back end service running at the cache 230, which may scan cache pages in the cache 230. When a page caching dirty data (i.e., data having not been flushed to the storage device 130) is found, the cache 123 may flush the data in the page to the storage device 130.

In some embodiments, in order to improve performance of I/O processing, after data to be stored is written to the cache 230, the cache 230 may return a response to the received I/O request, without waiting until the data is flushed to the storage device 130. The response may be finally returned to the host 110 via the protocol interface layer 210.

In some embodiments, when the data is flushed to the storage device 130, the flush engine 231 may check the tag associated with the data, which, for example, may indicate the compression property of the data. The flush engine 231 may flush the data from the cache 230 to the storage device 130 based on the compression property.

Figure 3:
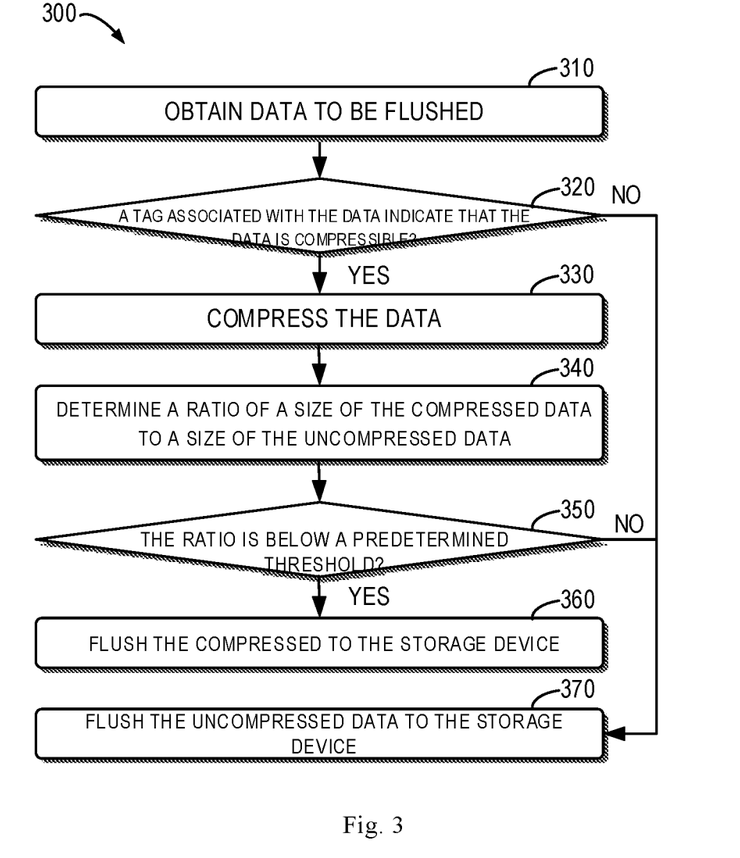
FIG. 3 illustrates a flowchart of an example method of flushing data from cache to a storage device according to embodiments of the present disclosure.

FIG. 3 illustrates a flowchart of a method 300 of flushing data to a storage device according to embodiments of the present disclosure. The method 300 may be performed, for example, by the flush engine 231 as shown in FIG. 2. It would be appreciated that the method 300 may further include additional acts not shown and/or may skip the acts as shown, and the scope of the present disclosure is not limited in the aspect. The method 300 will be described below in detail with reference to FIG. 2.

At block 310, the flush engine 231 obtains the data to be flushed. At block 320, the flush engine 231 determines whether the tag associated with the data indicates that the data is compressible. If the data is compressible, at block 330, the flush engine 231 compresses the data with a compression engine. At block 340, the flush engine 231 determines a ratio of a size of the compressed data (which is also referred to as "first size") to a size of the uncompressed data (which is also referred to as "second size"). At block 350, the flush engine 231 determines whether the ratio is below a predetermined threshold (for example, 25%). If the ratio is below the predetermined threshold, the flush engine 231 flushes the compressed data to the storage device at block 360. If it is determined at block 320 that the data is not compressible or it is determined at block 350 that the data compression ratio is not below the predetermined threshold, the flush engine 231 flushes the uncompressed data to the storage device 130.

Figure 4:
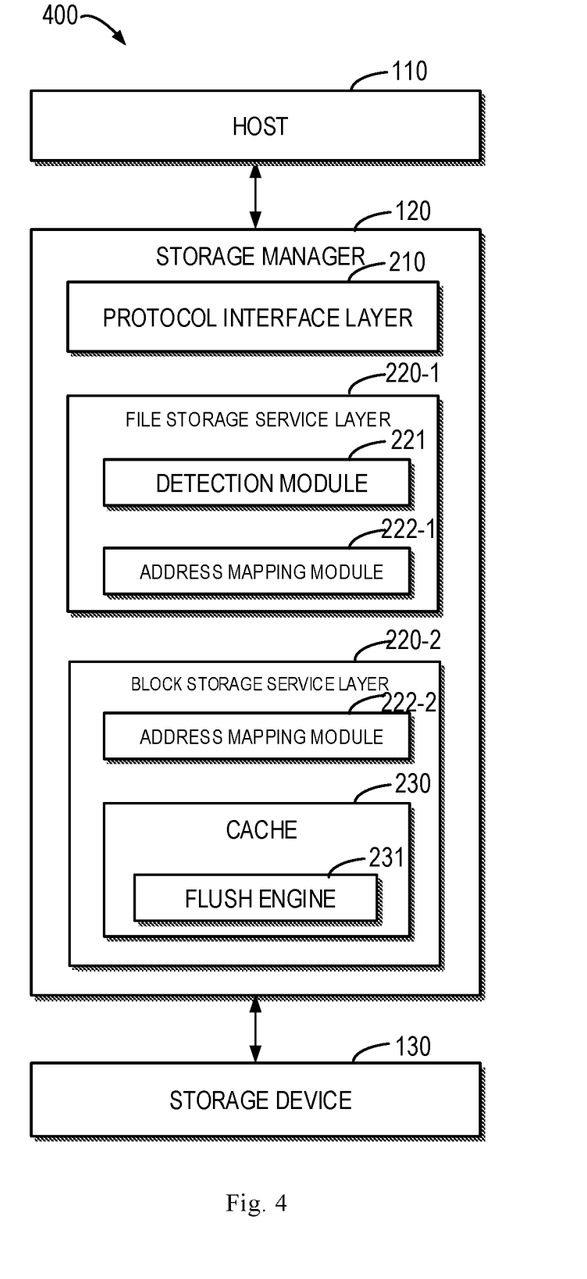
FIG. 4 illustrates a block diagram of an example storage system according to embodiments of the present disclosure.

FIG. 4 illustrates a block diagram of a storage system 400 for storing data according to embodiments of the present disclosure. In FIG. 4, the storage service layer 220 as shown in FIG. 2 is divided into two storage service layers 220-1 and 220-2. For example, the storage system 400 can provide a storage service based on a file and a service based on a data block (for example, a logical storage unit), and the storage manager 120 therefore may include a file storage service layer 220-1 for providing a storage service based on a file and a block storage service layer 220-2 for providing a storage service based on a block. For example, the detection module 221 as shown in FIG. 2 may be implemented at the file storage service layer 220-1, while the cache 230 running the flush engine 231 may be implemented at the block storage service layer 220-2. In addition, in FIG. 4, the address mapping module 222 as shown in FIG. 2 is divided into an address mapping module 222-1 and an address mapping module 222-2. The address mapping module 222-1 may be implemented at the file storage service layer 220-1, for implementing a conversion from the file offset address to the address of logical storage unit. The address mapping module 222-2 may be implemented at the block storage service layer 220-2, for implementing a conversion from the address of logical storage unit to the physical storage address.

Figure 5A:
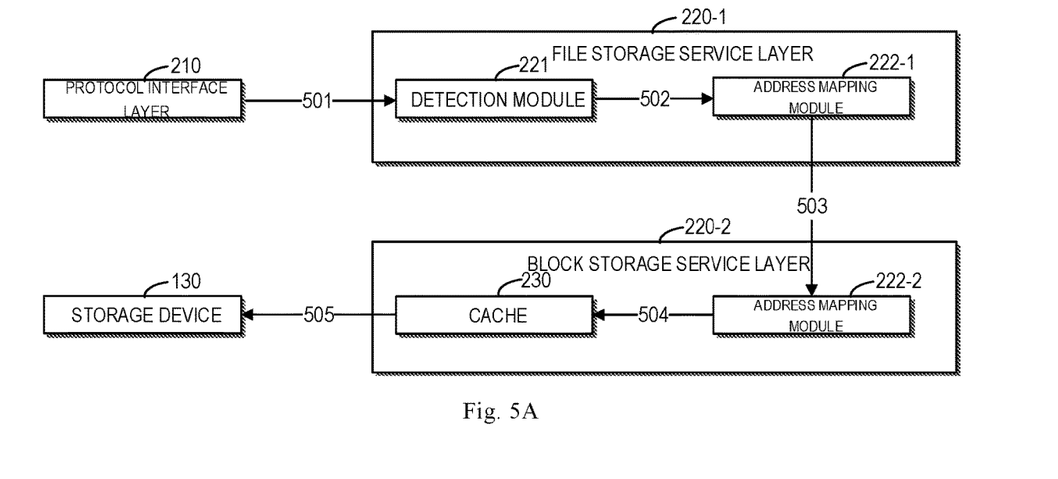
FIGS. 5A and 5B illustrate schematic diagrams of example processing paths of an I/O request according to embodiments of the present disclosure.

FIG. 5A illustrates a schematic diagram of an example processing path of an I/O request in the storage system 400 according to embodiments of the present disclosure. As shown in FIG. 5A, an I/O request 501 for writing data to a file sent from the host 110 is forwarded via the protocol interface layer 210 to the detection module 221. The detection module 221 determines the type of the file involved in the I/O request 501, which indicates whether the file is a compressed file. If it is a compressed file, it indicates the data to be written is incompressible; if it is not a compressed file, it indicates that the data to be written is compressible The detection module 221 may generate a tag indicating a compression property of the data to be written, and tag the I/O request 501 with the generated tag, to generate the tagged I/O request 502. The tagged I/O request 502 is sent to the address mapping module 222-1. The address mapping module 222-1 converts the file offset address indicating the data write position in the I/O request 502 into an address of logical storage unit, and send the converted I/O request 503 to the address mapping module 222-2. The address mapping module 222-2 converts the address of the logical storage unit in the I/O request 503 into a physical storage address, and caches the I/O request 504 undergoing the address conversion, together with the data to be stored, into the cache 230. The flush engine 231 running at the cache 230 flushes the data 505 to the storage device 130 by performing the method 300 as shown in FIG. 3.

Since address conversion generally consumes more system resources, for example, in the block storage service layer 220-2, the I/O request may be first cached into the cache 230 and then undergo the address conversion via the address mapping module 222-2 in some embodiments, in order to further improve the efficiency of processing an I/O request.

Figure 5B:
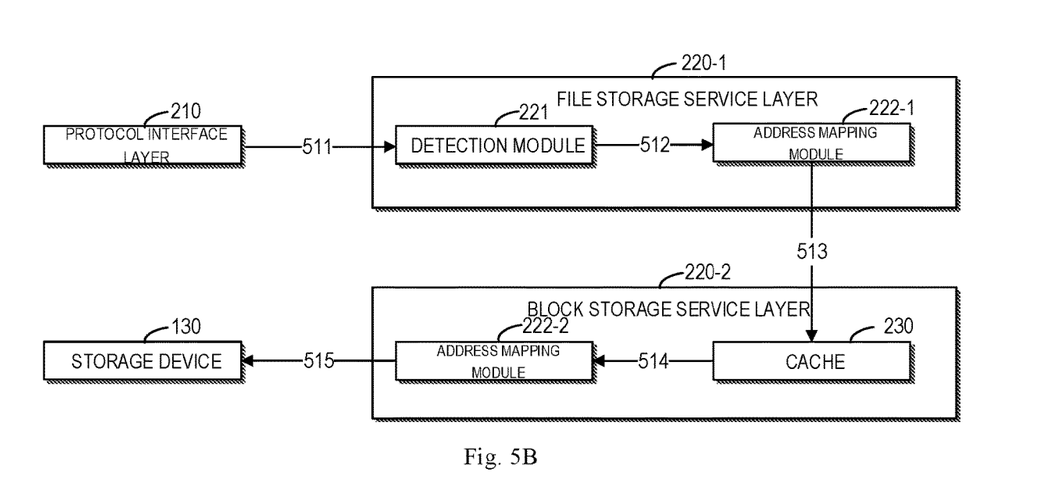

FIG. 5B illustrates a schematic diagram of a further example processing path of an I/O request in the storage system 400 according to embodiments of the present disclosure. As shown in FIG. 5B, an I/O request 511 for writing data into a file sent from the host 110 is forwarded to the detection module 221 via the protocol interface layer 210. The detection module 221 determines a type of a file involved in the I/O request 511, which indicates whether the file is a compressed file. If it is a compressed file, it indicates that the data to be written are incompressible; and if it is not a compressed file, it indicates that the data to be written is compressible. The detection module 221 may generate a tag indicating a compression property of the data to be written, and tag the I/O request 511 with the generated tag, to generate a tagged I/O request 512. The tagged I/O request 502 is sent to the address mapping module 222-1. The address mapping module 222-1 converts a file offset address indicating the data write position in the I/O request 502 into an address of logical storage unit, and caches the converted I/O request 513, together with data to be stored, to the cache 230. The flush engine 231 running at the cache 230 flushes the cached data to the storage device 130 by performing the method 300 as shown in FIG. 3. Specifically, the cache 230 may send data to be flushed, together with an address 514 of logical storage unit thereof, to the address mapping module 222-2. The address mapping module 222-2 converts the received address of logical storage unit into a physical storage address, and stores the data 515 into the storage device 130 based on the physical storage address.

In the way, the storage manager can directly store data or a data block that have been compressed into the storage device without compressing, thereby saving a great amount of overhead for data compression and subsequent checking on compression efficiency. Moreover, flush efficiency of the flush engine and throughput of the cache can be improved as well. Since capacity of the cache is typically not large, the cache will become full easily if it takes a lot of time to compress each data block and check the compression efficiency. When the cache becomes full, subsequent I/O requests have to bypass the cache such that it is hard to estimate response time of these I/O requests. The embodiments of the present disclosure enable the cache to serve more I/O requests and thus bring about a short processing latency.

Figure 6:
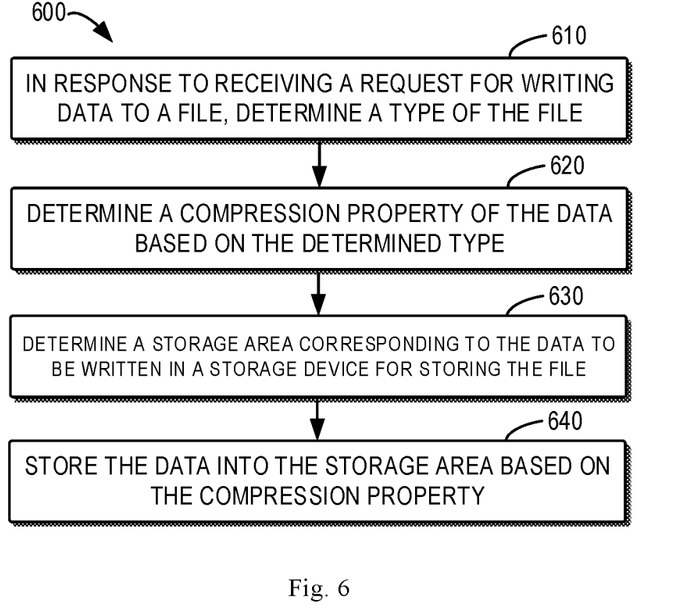
FIG. 6 illustrates a flowchart of an example method of storing data according to embodiments of the present disclosure.

FIG. 6 illustrates a flowchart of an example method 600 for storing data according to embodiments of the present disclosure. For example, the method 600 may be performed by the storage manager 120 as shown in FIG. 1, 2 or 4. It would be appreciated that the method 600 may further include additional acts not shown and/or may skip acts as shown, and the scope of the present disclosure is not limited in the aspect. The method will be described below in detail with reference to FIG. 1.

At block 610, in response to receiving a request for writing data into a file, the storage manager 120 determines a type of the file.

At block 620, the storage manager 120 determines a compression property of the data based on the determined type.

At block 630, the storage manger 120 determines a storage area corresponding to data to be written in the storage device for storing the file.

At block 640, the storage manager 120 stores the data into the storage area based on the compression property.

In some embodiments, the storage manager 120 may obtain a file name of the file from the request, and determine the type of the file based on the file name.

In some embodiments, the file name includes a main file name and an extension file name. The storage manager 120 may match the extension file name in the file name with a predetermined extension file name of a compressed file. In response to the extension file name matching the predetermined extension file name, the storage manager 120 may determine that the file is a compressed file.

In some embodiments, in response to the file being created, the storage manager 120 may obtain from the file a sequence of bytes indicating the type of the file, and determine the type of the file based on the sequence of bytes.

In some embodiments, the storage manager 120 may match the sequence of bytes with a predetermined sequence of bytes indicating a compressed file. In response to the sequence of bytes matching the predetermined sequence of bytes, the storage manager 120 can determine the file as a compressed file.

In some embodiments, in response to the file being created, the storage manager 120 may obtain the metadata of the file system associated with file, in which the type of the file is recorded in the metadata of the file system. The storage manager 120 may determine the type of the file based on the metadata of the file system.

In some embodiments, in response to the type indicating that the file is a compressed file, the storage manager 120 may determine that the data is incompressible. Additionally or alternatively, in response to the type indicating that the file is a uncompressed file, the storage manager 120 may determine that the data compressible.

In some embodiments, the storage manager 120 may generate a tag indicating a compression property. The storage manager 120 can store the tag in association with the data into the cache. In response to the data being stored into the cache, the storage manager 120 may return a response to the request. The storage manager 120 may flush the data from the cache to the storage area based further on the tag associated with the data.

In some embodiments, in response to the data indicating that the data is incompressible, the storage manager 120 may flush the uncompressed data to the storage area.

In some embodiments, in response to the tag indicating that the data is compressible, the storage manager 120 may compress the data. The storage manager 120 may determine a ratio of a first size of the compressed data to a second size of the uncompressed data. In response to the ratio being below a predetermined threshold, the storage manger 120 may flush the compressed data to the storage area. In response to the ratio exceeding the predetermined threshold, the storage manager 120 may flush the uncompressed data to the storage area.

Example implementations of the method according to the present disclosure have been described above in detail with reference to FIGS. 1 and 6, and a corresponding device will be described below.

In some embodiments, there is provided a device for storing data. The device includes a first determining module configured, in response to receiving a request for writing data to a file, to determine a type of the file; a second determining module configured to determine a compression property of the data based on the determined type; a third determining module configured to determine a storage area corresponding to data to be written in a storage device for storing the file; and a storage module configured to store data to the storage area based on the compression property.

In some embodiments, the first determining module is further configured to: obtain a file name of the file from the request; and determining the type of the file based on the file name.

In some embodiments, the file name includes a main file name and an extension file name. The first determining module is further configured to: match the extension file name in the file name with a predetermined extended fine name indicating that a file is a compressed file; and in response to the extension file name in the file name matching the predetermined extension file name indicating that a file is a compressed file, determine that the file is a compressed file.

In some embodiments, the first determining module is further configured to: in response to the file being created, obtain from the file a sequence of bytes indicating the type of the file; and determining the type of the file based on the sequence of bytes.

In some embodiments, the first determining module is further configured to: match the sequence of bytes with the predetermined sequence of bytes indicating a compressed file; and in response to the sequence of bytes matching the predetermined sequence of bytes, determine that the file is a compressed file.

In some embodiments, the first determining module is further configured to: in response to the file being created, obtain metadata of the file system associated with the file, wherein the type of the file is recorded in the metadata of the file system; and determine the type of the file based on the metadata of the file system.

In some embodiments, the second determining module is further configured to: in response to the type indicating that the file is a compressed file, determining that the data is incompressible; and in response to the type indicating that the file is uncompressed file, determining that the data is compressible.

In some embodiments, the storage module is further configured to: generate a tag indicating a compression property; store the tag in association with the data into the cache; in response to the data being stored into the cache, return a response to the request; and flush the data from the cache to the storage area based on the tag associated with the data.

In some embodiments, the storage module is further configured to: in response to the tag indicating that the data is incompressible, flush the uncompressed data to the storage area.

In some embodiments, the storage module is further configured to: in response to the tag indicating that the data is compressible, compress the data; determine a ratio of a first size of the compressed data to a second size of the uncompressed data; in response to the ratio being below a predetermined threshold, flush the compressed data to the storage area; and in response to the ratio exceeding the predetermined threshold, flush the uncompressed data to the storage area.

Figure 7:
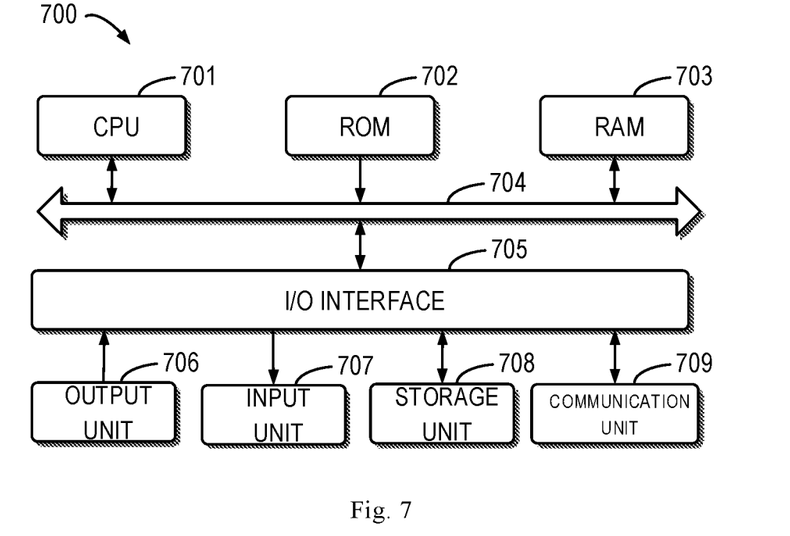
FIG. 7 illustrates a schematic diagram of an example device that can be used to implement embodiments of the present disclosure.

FIG. 7 illustrates a block diagram of an example device 700 that may be used to implement the embodiments of the present disclosure. For example, the storage manger 120 as shown in FIG. 1, 2 or 3 may be implemented by the device 700. As shown in FIG. 7, the device 700 includes a central processing unit (CPU) 701 which performs various appropriate actions and processing, based on a computer program instruction stored in a read-only memory (ROM) 702 or computer program instructions loaded from a storage unit 708 to a random access memory (RAM) 703. The RAM 703 stores therein various programs and data required for operations of the device 700. The CPU 701, the ROM 702 and the RAM 703 are connected via a bus 704 with one another. An input/output (I/O) interface 705 is also connected to the bus 704.

The following components in the device 700 are connected to the I/O interface 705: an input unit 706 such as a keyboard, a mouse and the like; an output unit 707 such as various kinds of displays and a loudspeaker, etc.; a storage unit 708 such as a magnetic disk, an optical disk, and etc.; a communication unit 709 including a network card, a modem, and a wireless communication transceiver, etc. The communication unit 709 allows the device 700 to exchange information/data with other devices through a computer network such as the Internet and/or various kinds of telecommunications networks.

Various processes and processing described above, e.g., the method 300 and/or 600, may be performed by the processing unit 701. For example, in some embodiments, the method 300 and/or 600 may be implemented as a computer software program that is tangibly included in a machine readable medium, e.g., the storage unit 708. In some embodiments, part or all of the computer programs may be loaded and/or mounted onto the device 700 via the ROM 702 and/or the communication unit 709. When the computer program is loaded to the RAM 703 and executed by the CPU 701, one or more steps of the method 300 and/or 600 as described above may be performed.

The present disclosure may be a method, a device, a system, and/or a computer program product. The computer program product may include a computer-readable storage medium having computer-readable program instructions thereon for causing a processor to carry out aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer-readable program instructions described herein may be downloaded to respective computing/processing devices from a computer-readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, devices (systems), and computer program products according to embodiments of the disclosure. It will be understood that each block of the flowchart illustrations and/or block diagrams, and combinations of blocks in the flowchart illustrations and/or block diagrams, may be implemented by computer-readable program instructions.

These computer-readable program instructions may be provided to a processor unit of a general purpose computer, special purpose computer, or other programmable data processing device to produce a machine, such that the instructions, when executed via the processing unit of the computer or other programmable data processing device, create means (e.g., specialized circuitry) for implementing the functions/acts specified in the flowchart and/or block diagram block or blocks. These computer-readable program instructions may also be stored in a computer-readable storage medium that can direct a computer, a programmable data processing device, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminologies used herein are chosen to best explain the principles of the embodiments, the practical application or technical improvement over technologies found in the marketplace, or to enable others of ordinary skill in the art to understand the embodiments disclosed herein.

We claim:

1. A method of storing data, comprising:
   in response to receiving a request for writing data to a file, determining a type of the file;
   determining a compression property of the data based on the determined type, the compression property indicating that the data is one of compressible and incompressible;
   generating a tag indicating the compression property of the data;
   tagging the request with the generated tag;
   determining a storage area corresponding to the data to be written in a storage device for storing the file;
   obtaining the compression property of the data by checking the tag of the tagged request;
   in response to the obtained compression property indicating that the data is compressible, compressing the data and storing the compressed data in the storage area; and
   in response to the obtained compression property indicating that the data is incompressible, avoiding compressing the data and storing the data in the storage area.

2. The method of claim 1, wherein determining the type of the file comprises:
   obtaining a file name of the file from the request; and
   determining the type of the file based on the file name.

3. The method of claim 2, wherein the file name comprises a main file name and an extension file name, and wherein determining the type based on the file name comprises:
   matching the extension file name in the file name with a predetermined extension file name indicating a compressed file; and
   in response to the extension file name matching the predetermined extension file name, determining that the file is a compressed file.

4. The method of claim 1, wherein determining the type of the file comprises:
   in response to the file being created, obtaining from the file a sequence of bytes indicating the type of the file; and
   determining the type of the file based on the sequence of bytes.

5. The method of claim 4, wherein determining the type based on the sequence of bytes comprises:
   matching the sequence of bytes with a predetermined sequence of bytes indicating a compressed file; and
   in response to the sequence of bytes matching the predetermined sequence of bytes, determining that the file is a compressed file.

6. The method of claim 1, wherein determining the type of the file comprises:
   in response to the file being created, obtaining metadata of a file system associated with the file, wherein the type of the file is recorded in the metadata of the file system; and
   determining the type of the file based on the metadata of the file system.

7. The method of claim 1, wherein determining the compression property of the data comprises:
   in response to the type indicating that the file is a compressed file, determining that the data is incompressible; and
   in response to the type indicating that the file is an uncompressed file, determining that the data is compressible.

8. The method of claim 1, wherein storing the data in the storage area comprises:
   in further response to the obtained compression property indicating that the data is compressible:
      storing the tagged request in association with the compressed data in a cache; and
      in response to the compressed data being stored in the cache, returning a response to the request; and
   in further response to the obtained compression property indicating that the data is incompressible:
      storing the tagged request in association with the data in the cache; and
      in response to the data being stored in the cache, returning the response to the request.

9. The method of claim 8, further comprising:
   In further response to the obtained compression property indicating that the data is incompressible, flushing the data to the storage area.

10. The method of claim 8, further comprising:
    In further response to the obtained compression property indicating that the data is compressible:
       determining a ratio of a first size of the compressed data to a second size of the data prior to being compressed; and
       in response to the ratio being below a predetermined threshold, flushing the compressed data to the storage area.

11. A device for storing data, comprising:
    at least one processing unit;
    at least one memory coupled to the at least one processing unit and storing instructions which, when executed by the at least one processing unit cause the device to perform acts comprising:
       in response to receiving a request for writing data to a file, determining a type of the file;
       determining a compression property of the data based on the determined type, the compression property indicating that the data is one of compressible and incompressible;
       generating a tag indicating the compression property of the data;
       tagging the request with the generated tag;
       determining a storage area corresponding to the data to be written in a storage device for storing the file;
       obtaining the compression property of the data by checking the tag of the tagged request;
       in response to the obtained compression property indicating that the data is compressible, compressing the data and storing the compressed data in the storage area; and in response to the obtained compression property indicating that the data is incompressible, avoiding compressing the data and storing the data in the storage area.

12. The device of claim 11, wherein determining the type of the file comprises:
   obtaining a file name of the file from the request; and
   determining the type of the file based on the file name.

13. The device of claim 12, wherein the file name comprises a main file name and an extension file name, and wherein determining the type based on the file name comprises:
   matching the extension file name in the file name with a predetermined extension file name indicating a compressed file; and
   in response to the extension file name matching the predetermined extension file name, determining that the file is a compressed file.

14. The device of claim 11, wherein determining the type of the file comprises:
   in response to the file being created, obtaining from the file a sequence of bytes indicating the type of the file; and
   determining the type of the file based on the sequence of bytes.

15. The device of claim 14, wherein determining the type, based on the sequence of bytes, comprises:
   matching the sequence of bytes with a predetermined sequence of bytes indicating a compressed file; and
   in response to the sequence of bytes matching the predetermined sequence of bytes, determining that the file is a compressed file.

16. The device of claim 11, wherein determining the type of the file comprises:
   in response to the file being created, obtaining metadata of a file system associated with the file, wherein the type of the file is recorded in the metadata of the file system; and
   determining the type of the file based on the metadata of the file system.

17. The device of claim 11, wherein determining the compression property of the data comprises:
   in response to the type indicating that the file is a compressed file, determining that the data is incompressible; and
   in response to the type indicating that the file is an uncompressed file, determining that the data is compressible.

18. The device of claim 11, wherein storing the data in the storage area comprises:
   in further response to the obtained compression property indicating that the data is compressible:
      storing the tagged request in association with the compressed data in a cache; and
      in response to the compressed data being stored in the cache, returning a response to the request; and
   in further response to the obtained compression property indicating that the data is incompressible:
      storing the tagged request in association with the data in the cache; and
      in response to the data being stored in the cache, returning the response to the request.

19. The device of claim 18, wherein the stored instructions, when executed by the at least one processing unit, cause the device to perform a further act comprising:
   In further response to the obtained compression property indicating that the data is incompressible, flushing the data to the storage area.

20. The device of claim 18, wherein the stored instructions, when executed by the at least one processing unit, cause the device to perform further acts comprising:
   In further response to the obtained compression property indicating that the data is compressible:
      determining a ratio of a first size of the compressed data to a second size of the data prior to being compressed; and
      in response to the ratio being below a predetermined threshold, flushing the compressed data to the storage area.

21. A computer program product having a non-transitory computer readable medium which stores a set of instructions to store data; the set of instructions, when carried out by computerized circuitry, causing the computerized circuitry to perform a method of:
   in response to receiving a request for writing data to a file, determining a type of the file;
   determining a compression property of the data based on the determined type, the compression property indicating that the data is one of compressible and incompressible;
   generating a tag indicating the compression property of the data;
   tagging the request with the generated tag;
   determining a storage area corresponding to the data to be written in a storage device for storing the file;
   obtaining the compression property of the data by checking the tag of the tagged request;
   in response to the obtained compression property indicating that the data is compressible, compressing the data and storing the compressed data in the storage area; and
   in response to the obtained compression property indicating that the data is incompressible, avoiding compressing the data and storing the data in the storage area.

* * * * *